(12) United States Patent
Hu et al.

(10) Patent No.: US 11,194,522 B2
(45) Date of Patent: Dec. 7, 2021

(54) NETWORKED SHUFFLE STORAGE

(71) Applicant: Intel Corporation, Santa Clara, CA (US)

(72) Inventors: Xiao Hu, Shanghai (CN); Huan Zhou, Shanghai (CN); Sujoy Sen, Portland, OR (US); Anjaneya R. Chagam Reddy, Chandler, AZ (US); Mohan J. Kumar, Aloha, OR (US); Chong Han, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/634,436

(22) PCT Filed: Aug. 16, 2017

(86) PCT No.: PCT/CN2017/097632
§ 371 (c)(1),
(2) Date: Jan. 27, 2020

(87) PCT Pub. No.: WO2019/033292
PCT Pub. Date: Feb. 21, 2019

(65) Prior Publication Data
US 2020/0210114 A1    Jul. 2, 2020

(51) Int. Cl.
*G06F 3/06* (2006.01)
*G06F 16/23* (2019.01)

(52) U.S. Cl.
CPC .......... *G06F 3/0661* (2013.01); *G06F 3/0608* (2013.01); *G06F 3/0679* (2013.01); *G06F 16/2379* (2019.01)

(58) Field of Classification Search
CPC .. G06F 3/0661; G06F 16/2379; G06F 3/0608; G06F 3/0679; G06F 16/23; G06F 16/25; G06F 16/00
See application file for complete search history.

(56) References Cited

U.S. PATENT DOCUMENTS

2014/0358977 A1    12/2014   Cramer et al.
2015/0067243 A1*   3/2015    Salessi ................... G06F 16/28
                                                       711/103

(Continued)

FOREIGN PATENT DOCUMENTS

KR    101686346 B1    12/2016

OTHER PUBLICATIONS

International Patent Office—International Search Report and Written Opinion dated May 15, 2018 from International Application No. PCT/CN2017/097632, 9 pages.

*Primary Examiner* — Masud K Khan
*Assistant Examiner* — Dustin B. Fulford
(74) *Attorney, Agent, or Firm* — Schwabe, Williamson & Wyatt, P.C.

(57) ABSTRACT

Apparatuses for computing are disclosed herein. An apparatus may include a set of data reduction modules to perform data reduction operations on sets of (key, value) data pairs to reduce an amount of values associated with a shared key, wherein the (key, value) data pairs are stored in a plurality of queues located in a plurality of solid state drives remote from the apparatus. The apparatus may further include a memory access module, communicably coupled to the set of data reduction modules, to directly transfer individual ones of the sets of queued (key, value) data pairs from the plurality of remote solid state drives through remote random access of the solid state drives, via a network, without using intermediate staging storage. Other embodiments may be disclosed or claimed.

18 Claims, 10 Drawing Sheets

(56) References Cited

U.S. PATENT DOCUMENTS

| | | |
|---|---|---|
| 2016/0103845 A1 | 4/2016 | Yeddanapudi et al. |
| 2016/0117107 A1 | 4/2016 | Ahuja et al. |
| 2018/0196611 A1* | 7/2018 | Wei .................. G06F 3/0658 |

* cited by examiner

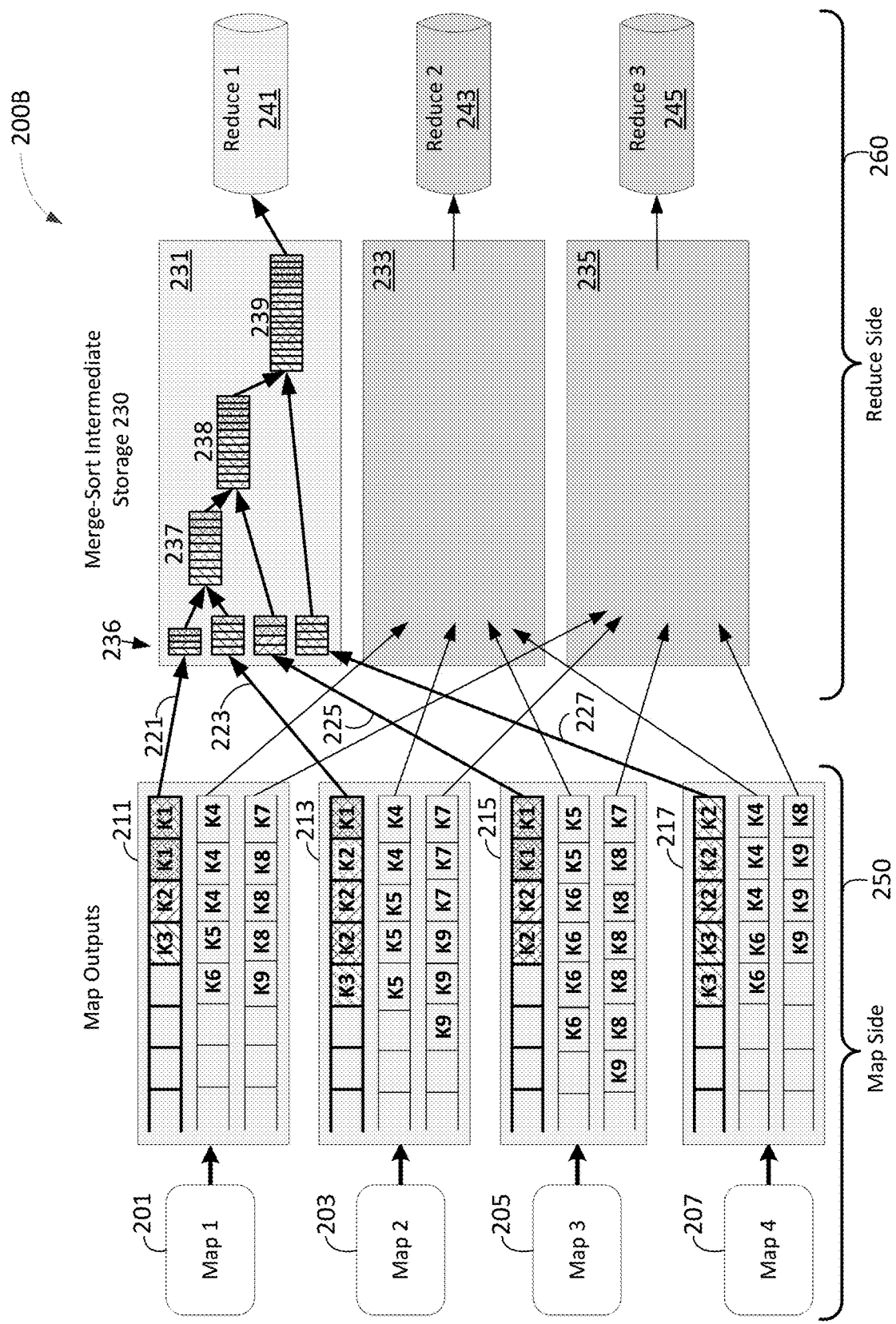
FIG. 2B – PRIOR ART

NETWORKED SHUFFLE STORAGE

CROSS REFERENCE TO RELATED APPLICATIONS

The present application is a national phase entry under 35 U.S.C. § 371 of International Application No. PCT/CN2017/097632, filed Aug. 16, 2017, entitled "Networked Shuffle Storage", which designated, among the various States, the United States of America. The Specifications of the PCT/CN2017/097632 Application is hereby incorporated by reference.

FIELD

Various embodiments generally relate to the field of big data computing, and in particular to improved implementations of the shuffle paradigm through remote random access of a storage device, via a network, without using intermediate staging storage.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

In big data computing, a MapReduce program composed of a Map( ) procedure and a Reduce( ) method are often used to perform filtering and sorting (such as, for example, sorting students by first name into queues, one queue for each name) and a summary operation (such as, for example, counting the number of students in each queue, yielding name frequencies). The "MapReduce System" (also called "infrastructure" or "framework") orchestrates the processing by marshalling distributed servers, running the various tasks in parallel, managing all communications and data transfers between the various parts of the system, and providing for redundancy and fault tolerance.

MapReduce is a framework for processing parallelizable problems across large datasets using a large number of computers (nodes), collectively referred to as a cluster, if all nodes are on the same local network and use similar hardware, or a grid, if the nodes are shared across geographically and administratively distributed systems, and use more heterogeneous hardware. Processing can occur on data stored either in a file system (unstructured) or in a database (structured). MapReduce can take advantage of the locality of data, processing it near the place it is stored in order to minimize communication overhead. A MapReduce may have three steps. First, a "Map" step where each mapper node applies the "map( )" function to the local data, and writes the output to a temporary storage. A master node ensures that only one copy of redundant input data is processed. Second, a "Shuffle" step, where worker nodes redistribute data based on the output keys (produced by the "map( )" function), such that all data belonging to one key is located on the same worker node. Finally, there may be a "Reduce" step, where reduction nodes process each group of output data, per key, in parallel.

MapReduce allows for distributed processing of the map and reduction operations. Provided that each mapping operation is independent of the others, all maps can be performed in parallel—though in practice this is limited by the number of independent data sources and/or the number of CPUs near each source. Similarly, a set of "reducers" can perform the reduction phase, provided that all outputs of the map operation that share the same key are presented to the same reducer at the same time.

Today MapReduce may not be fully leveraged, especially as regards efficient transfer of data between a mapper module and a reduction module.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 2B illustrates an example implementation of a shuffle using intermediate staging storage.

DETAILED DESCRIPTION

Figure 1:
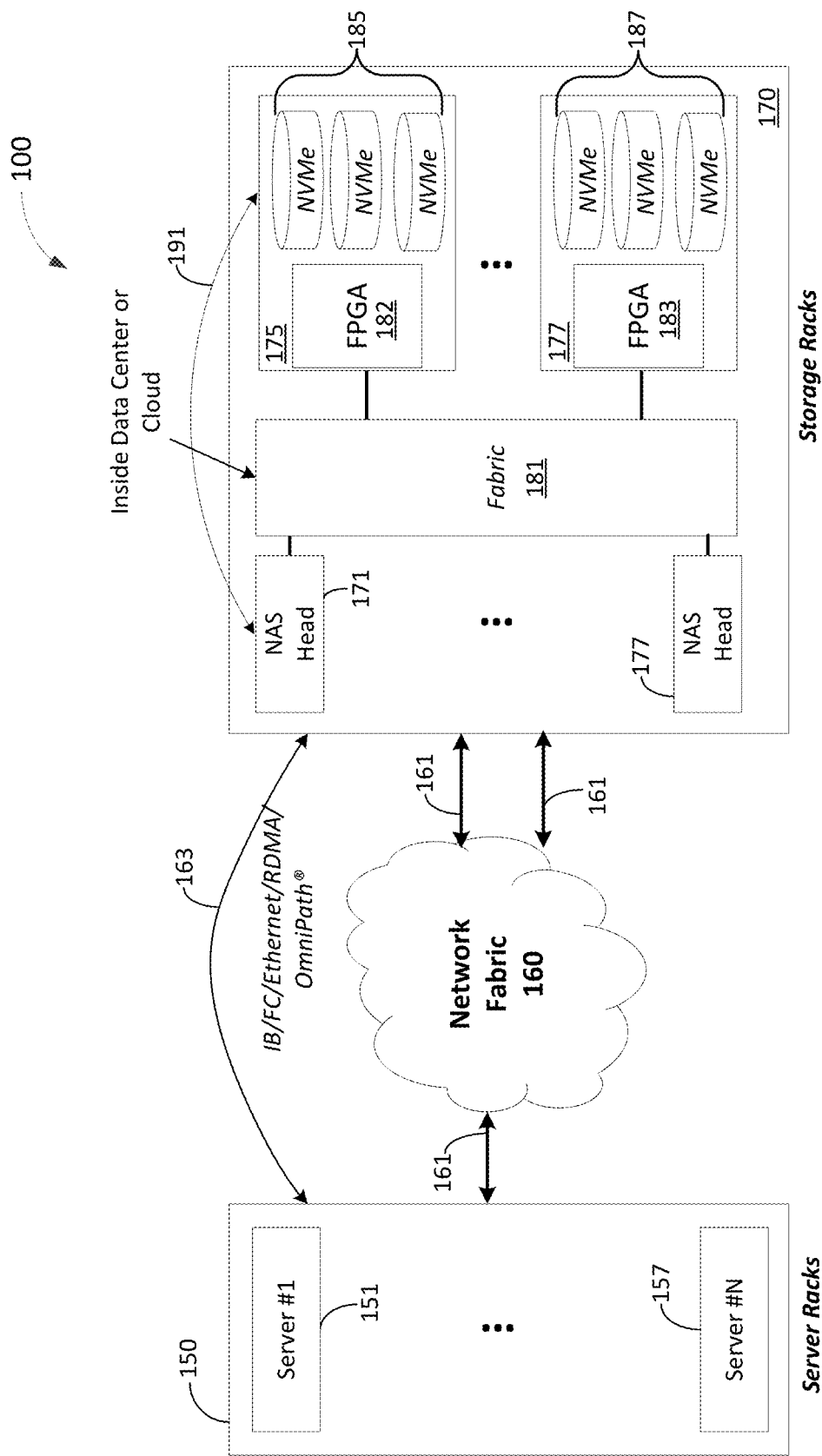
FIG. 1 illustrates an example system according to various embodiments.

Cloud computing is a relatively new form of Internet-based computing that provides shared computer processing resources and data to computers and other devices on demand. It is a model for enabling ubiquitous, on-demand access to a shared pool of configurable computing resources (e.g., computer networks, servers, storage, applications and services), which can be rapidly provisioned and released with minimal management effort. Basically, Cloud computing allows the users and enterprises with various capabilities to store and process their data in either privately owned cloud, or on a third-party server in order to make data accessing mechanisms much more easy and reliable. Data centers that may be located far from the user-ranging in distance from across a city to across the world—may be accessed. Cloud computing relies on sharing of resources to achieve coherence and economy of scale, similar to a utility (like the electricity grid) over an electricity network.

It is noted, however, that for many big data and cloud computing applications conventional data storage and data storage centers cannot keep up with the intensive remote-random-I/O demands placed on them. One example of a big data application is the Hadoop® MapReduce programming framework. Hadoop® is an open source Java based programming framework that supports the processing and distributed storage of very large data sets. As opposed to using one large computer to process and store data, Hadoop® allows clustering commodity hardware together to analyze massive datasets in parallel.

MapReduce allows for massive scalability across hundreds or thousands of servers in a Hadoop® cluster. The term MapReduce actually refers to two separate and distinct tasks that Hadoop® programs perform. The first is the map job, which takes a set of data and converts it into another set of data, where individual elements are broken down into tuples (<Key, Value> pairs). The reduce job takes the output from a map as its input and combines those data tuples into a smaller set of tuples. As the sequence of the name MapReduce implies, the reduce job is always performed after the map job. Hadoop® MapReduce processes workloads using frameworks that break down jobs into smaller pieces of work that may be distributed across nodes in cloud computing clusters. Moreover, by storing data in a remote data center users may decouple their compute layer from their storage layer, and not need to have extra nodes in their compute layer to maximize on-cluster storage.

As described more fully below, in theory a MapReduce process will invoke intensive remote-random-I/O at the Map Outputs when there are multiple Reduces simultaneously trying to retrieve the needed <Key, Value> pairs, one by one, from each of the Maps. For this reason, generally, the theoretical ideal MapReduce process has not been implemented using conventional infrastructure, which comprises slow storage media (e.g. hard disks), slow storage interface/protocols (e.g. Serial AT Attachment (SATA)), and conventional network stacks such as Hypertext Transfer Protocol (HTTP) over Transport Connect Protocol/Internet Protocol (TCP/IP). Thus, as described below, conventional, including state-of-the-art, implementations have had to make compromises, which results in a less than efficient MapReduce process, that does not exploit its full potential, and thus, the full potential of any big data processing that utilizes it.

In embodiments, a solution to this problem may lie in solid state drives and the network protocols that may be used to access them. In embodiments, high performance solid state drives that include byte addressable random access non-volatile memory, for example, may be used (e.g., 3D crosspoint memory). In embodiments, these solid state drives may be accessed using advanced specifications, such as, for example, the Nonvolatile Memory Express (NVMe) Over Fabrics specification, which is a technology specification designed to enable NVMe message-based commands to transfer data between a host computer and a target solid-state storage device or system using a network protocol such as Ethernet, Fibre Channel, and InfiniBand.

FIG. 1 illustrates an example system 100 that may be used, in embodiments, to access NVMe solid state drives using the NVMe over Fabric specification. With reference to FIG. 1 there may be a set of servers, Server 1 151 through Server N 157, in one or more Server Racks 150. The servers in Server Racks 150 may perform processing of data, such as one or both of a Hadoop® MapReduce process. The various outputs of a Map process, which will be the inputs to a corresponding Reduce process, for example, may be stored in Storage Racks 170, which may be accessed over Network Fabric 160, through communications links 161. In embodiments, Network Fabric 160 may comply with a standard promulgated by NVM Express, such as NVMe over Fabrics 1.0 Gold (this standard is available at www.nvmexpress.org). There may additionally be communications between Server Rack 150 and Storage Racks 170 over network interconnect 163, which may be one or more of Inifiniband (IB), Fibre Channel (FC), Ethernet, Remote Direct Memory Access (RDMA), or OmniPath®.

Continuing with reference to FIG. 1, Storage Racks 170 may include several network—attached computer data storage servers, NAS Heads 171 through 177, which may connect over Fabric 181 to several corresponding solid state storage modules 175 through 177. There may also be communications between NAS Heads 171 through 177 and corresponding solid state storage modules 175 through 177 over network interconnect 191. Fabric 181 may also be NVMe over Fabrics compliant, and, as shown, may be within a given data center, or may be provided in the cloud. Solid state storage modules 175 through 177 may each include a field programmable gate array, FPGA 182, 183 and several solid state drives, here, for example, NVMe drives 185, 187. In embodiments, NVMe drives 185, 187 may include high performance storage media such as, for example, 3D cross-point.

In embodiments, an apparatus for computing may include a set of data reduction modules to perform data reduction operations on sets of (key, value) data pairs to reduce an amount of values associated with a shared key, wherein the (key, value) data pairs are stored in a plurality of queues located in a plurality of solid state memory remote from the apparatus. The apparatus may further include a memory access module, communicably coupled to the set of data reduction modules, to directly transfer individual ones of the sets of queued (key, value) data pairs from the plurality of remote solid state memory through remote random access of the solid state memory, via a network, using a non-volatile memory access over network protocol, without using intermediate staging storage.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed or described operations may be omitted in additional embodiments.

As used herein, including in the claims, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

In the description to follow, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Also, it is noted that embodiments may be described as a process depicted as a flowchart, a flow diagram, a dataflow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in the figure(s). A process may correspond to a method, a function, a procedure, a subroutine, a subprogram, and the like. When a process corresponds to a function, its termination may correspond to a return of the function to the calling function and/or the main function. Furthermore, a process may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium. A code segment may represent a procedure, a function, a subprogram, a program, a routine, a subroutine, a module, program code, a software package, a class, or any combination of instructions, data structures, program statements, and the like.

As used hereinafter, including the claims, the term "circuitry" may refer to, be part of, or include an Application Specific Integrated Circuit (ASIC), an electronic circuit, a processor (shared, dedicated, or group, including one or more "processing elements (PEs) of a data flow machine), and/or memory (shared, dedicated, or group) that execute one or more software or firmware programs, a programmable combinational logic circuit (e.g. Field Programmable Gate Arrays (FPGA)), and/or other suitable hardware components that provide the described functionality. In some embodiments, the circuitry may implement, or functions associated with the circuitry may be implemented by, one or more software or firmware modules.

As used hereinafter, including the claims, the term "memory" may represent one or more hardware devices for storing data, including random access memory (RAM), magnetic RAM, core memory, read only memory (ROM), magnetic disk storage mediums, optical storage mediums, non-volatile memory, non-volatile solid state drives (e.g., NVMe solid state drives (SSD)), flash memory devices and/or other machine readable mediums for storing data. The term "computer-readable medium" may include, but is not limited to, memory, portable or fixed storage devices, optical storage devices, wireless channels, and various other mediums capable of storing, containing or carrying instruction(s) and/or data.

As used hereinafter, including the claims, the terms "map", "Map" and "Map procedure" may be used interchangeably to refer to a mapping operation in a map-reduce framework. Similarly, the terms "reduce", "Reduce" and "Reduce method" may be used interchangeably to refer to a reduction operation in a map-reduce framework.

Figure 2A:
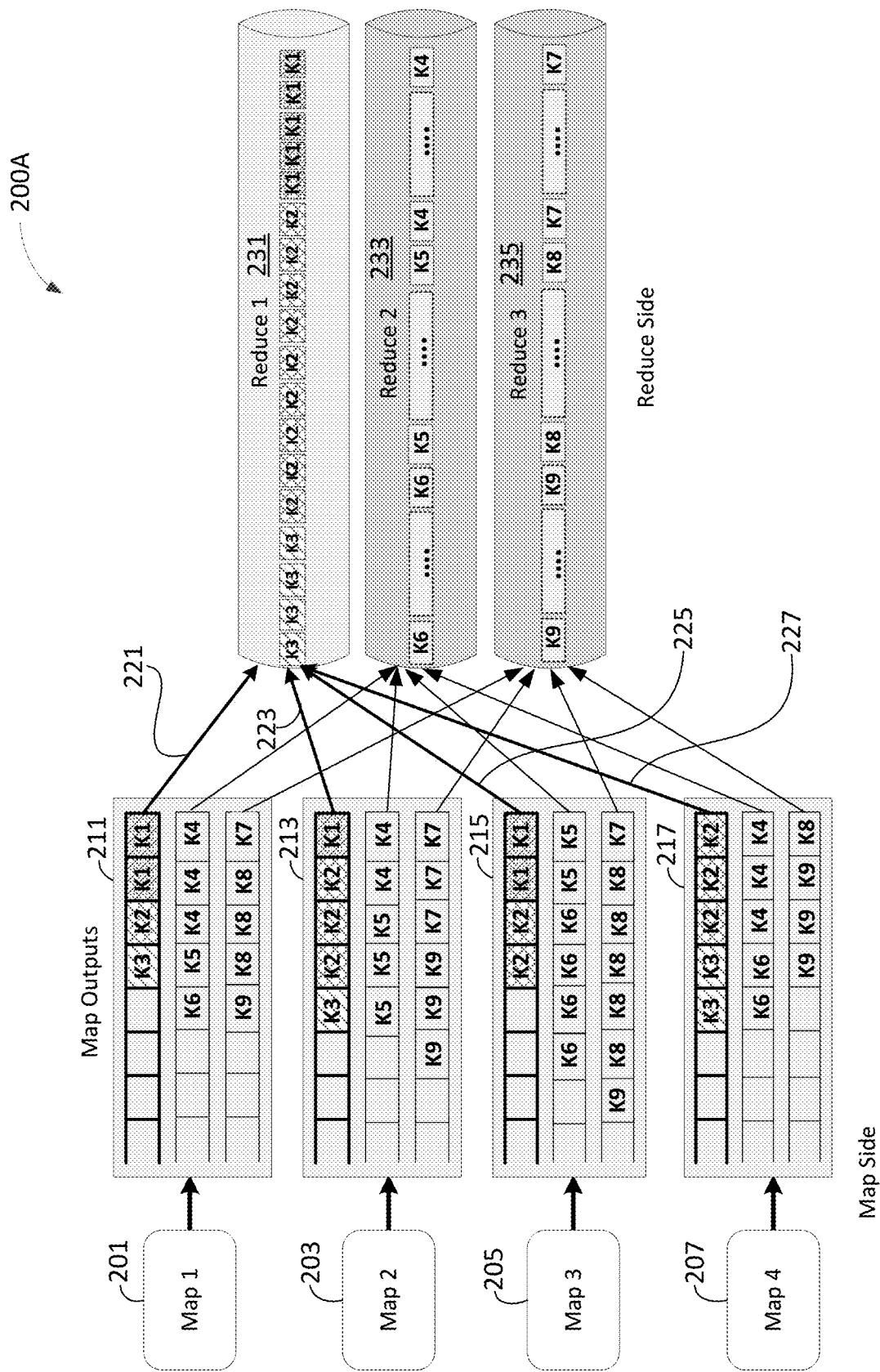
FIG. 2A illustrates a direct shuffle according to various embodiments of the present disclosure.

In embodiments, a direct shuffle may be performed, as described in detail below. To understand what is meant by a "direct shuffle" FIG. 2A illustrates a generalized system 100 for performing a (theoretical) direct shuffle, which is the most efficient process for performing a MapReduce operation. Direct shuffle is sometimes known as "theoretical" because it uses the most efficient approach. However, as noted above, and as described in detail below with reference to FIG. 2B, conventional systems—unlike various embodiments disclosed herein—have not been able to implement the system of FIG. 2A due to various input/output (I/O) bottlenecks.

With reference to FIG. 2A, beginning at the far left of the figure, there may be a set of map modules, Map 1 201, Map 2 203, Map 3 205 and Map 4 207. Each map module 201-207 may respectively operate on a set of local data to that map module, and may generate corresponding Map Outputs 211-217, each having one or multiple queues of <key, value> pairs (note: each row within a Map Output 211-217 is a queue). Each queue may be sorted in a local order. Thus, with reference to FIG. 2A, an example of four maps are shown, Map 1 201, Map 2, 203, Map 3 205 and Map 4 207. Each map outputs sets of <key, value> pairs, organized by the key, into a corresponding Map Output, which may be a memory. A Map Output may be coupled to the Map, or, for example, it may be separate from the Map. Map Output 211 receives the data of Map 1 201, Map Output 213 receives the data of Map 2 203, Map Output 215 receives the data of Map 3 205, and Map Output 217 receives the data of Map 4 207.

Considering Map Output 211, as noted, it contains several queues of <key, value> pairs output by Map 1 201. The upper queue in Map Output 211 contains <key, value> pairs comprising keys K1, K2 and K3. As may be seen, Map Output 213, in its top queue, has a different set of <key, value> pairs than either Map Output 211, or Map Outputs 215 and 217, have in their respective top queue, even though each top queue holds data from only keys K1, K2 and K3. This is because each map operates on its own local data. However, as noted above, to perform a reduction operation, a reduce module must gather all of the <key, value> pairs, output by all of the map modules associated with a given key, say K1. This is where the shuffle comes in. During shuffle, ideally, each reduction module remotely retrieves, from all of the map outputs, the corresponding <Key, Value> pairs one by one in a global order.

Illustrating this, continuing with reference to FIG. 2A, there are shown three reduction modules, each of them communicably coupled to all four of the Map Outputs 211, 213, 215 and 217. These reduction modules include Reduce 1 231, Reduce 2 233, and Reduce 3 235. As shown, for ease of illustration, Reduce 1 231 operates on <key, value> pairs having keys K1, K2 and K3, Reduce 2 233 operates on <key, value> pairs having keys K4, K5 and K6, and Reduce 3 235 operates on <key, value> pairs having keys K7, K8 and K9. Taking as an example Reduce 1 231, to perform the reduction operation Reduce 1 231 accesses the top queue of <key, value> pairs from each of Map Outputs 211, 213, 215 and 217, in a global order for each key. This is illustrated by arrows 221, 223, 225, and 227, which indicate memory transfers from the respective Map Outputs 211, 213, 215 and 217, all to Reduce 1 231. The <key, value> pairs are accessed in global order, which means all of the <key, value> pairs comprising key K1 are accessed, in order, from each map output, before Reduce 1 begins accessing the <key, value> pairs indexed by key K2, and so on for keys K2 and K3. Each of Reduce 2 233 and Reduce 3 235 does the same access of <key, value> pairs, from all Map Outputs, in global order. Because data is transferred from a plurality of individual map outputs to each of several reduction modules, the <key, value> pair data is said to be "shuffled."

As may be readily appreciated from the foregoing description, when implementing a theoretic shuffle, it is not efficient—or needed—to have a reduction module first store a globally sorted <Key, Value> sequence somewhere, so as to have all of the relevant <key, value> pairs sequentialized and then subsequently perform the reduce operation. Rather, the system may be designed so that each reduction module retrieves the <Key, Value> pairs that it needs to operate on one by one, in a global order, directly from the outputs of all the maps, as it performs a reduction operation. As may be understood, the theoretical shuffle process will invoke intensive remote-random-I/O at the Map Outputs when there are multiple Reduces simultaneously trying to retrieve the needed <Key, Value> pairs, one by one, from each of the Maps. For this reason, as described above, generally, theoretical shuffle has not been implemented using conventional infrastructure, which comprises slower storage media (e.g. hard disks, or ordinary Solid State Devices (SSDs)), slower storage interface/protocols (e.g. Serial AT Attachment (SATA)), and conventional network stacks (e.g. Hypertext Transfer Protocol (HTTP) over Transport Connect Protocol/Internet Protocol (TCP/IP), etc.). Thus, conventional, including state-of-the-art, implementations have had to make compromises, which resulted in a less than efficient shuffle.

Figure 3A:
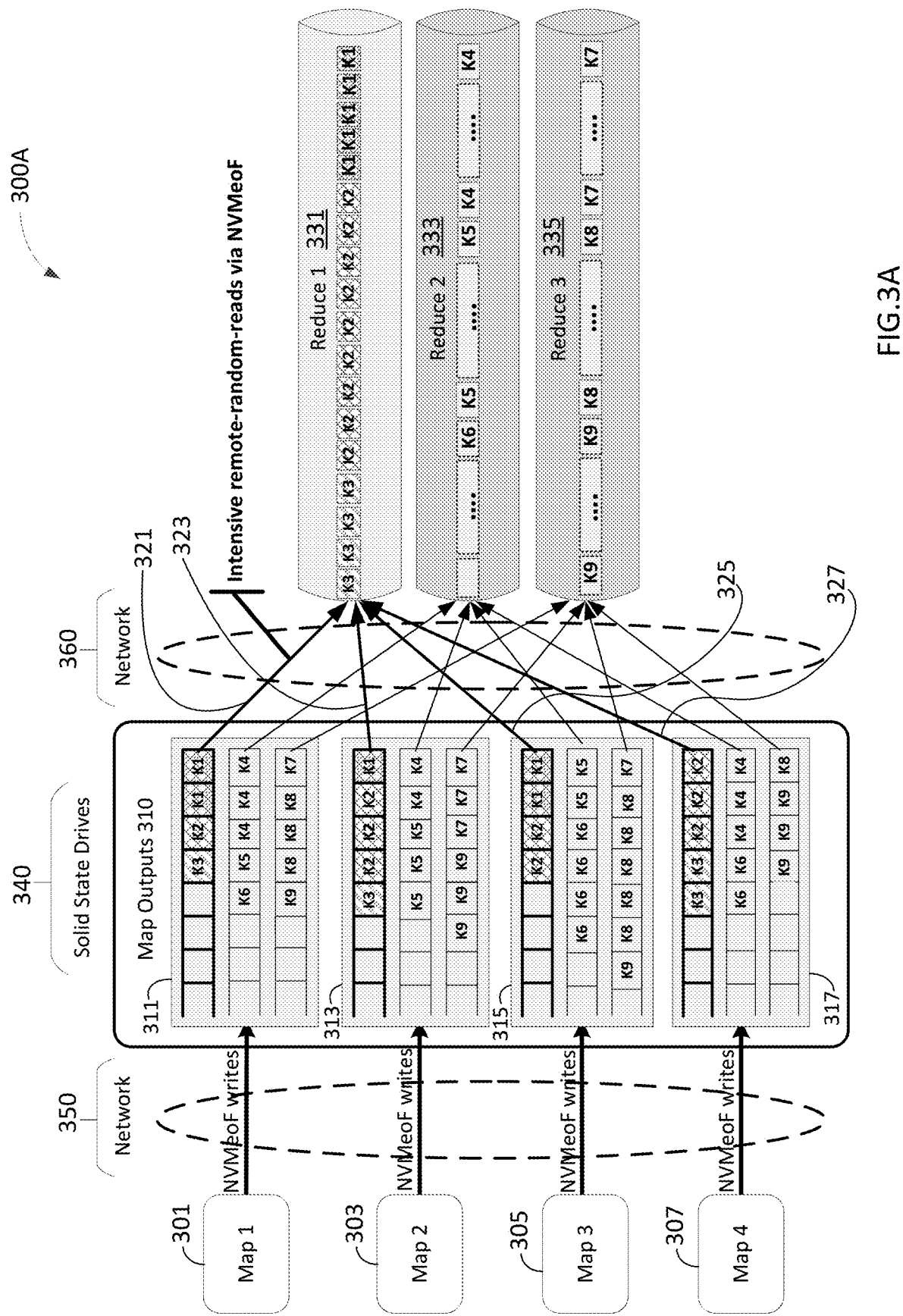
FIG. 3A illustrates an example implementation of a direct shuffle according to various embodiments.
Figure 3B:
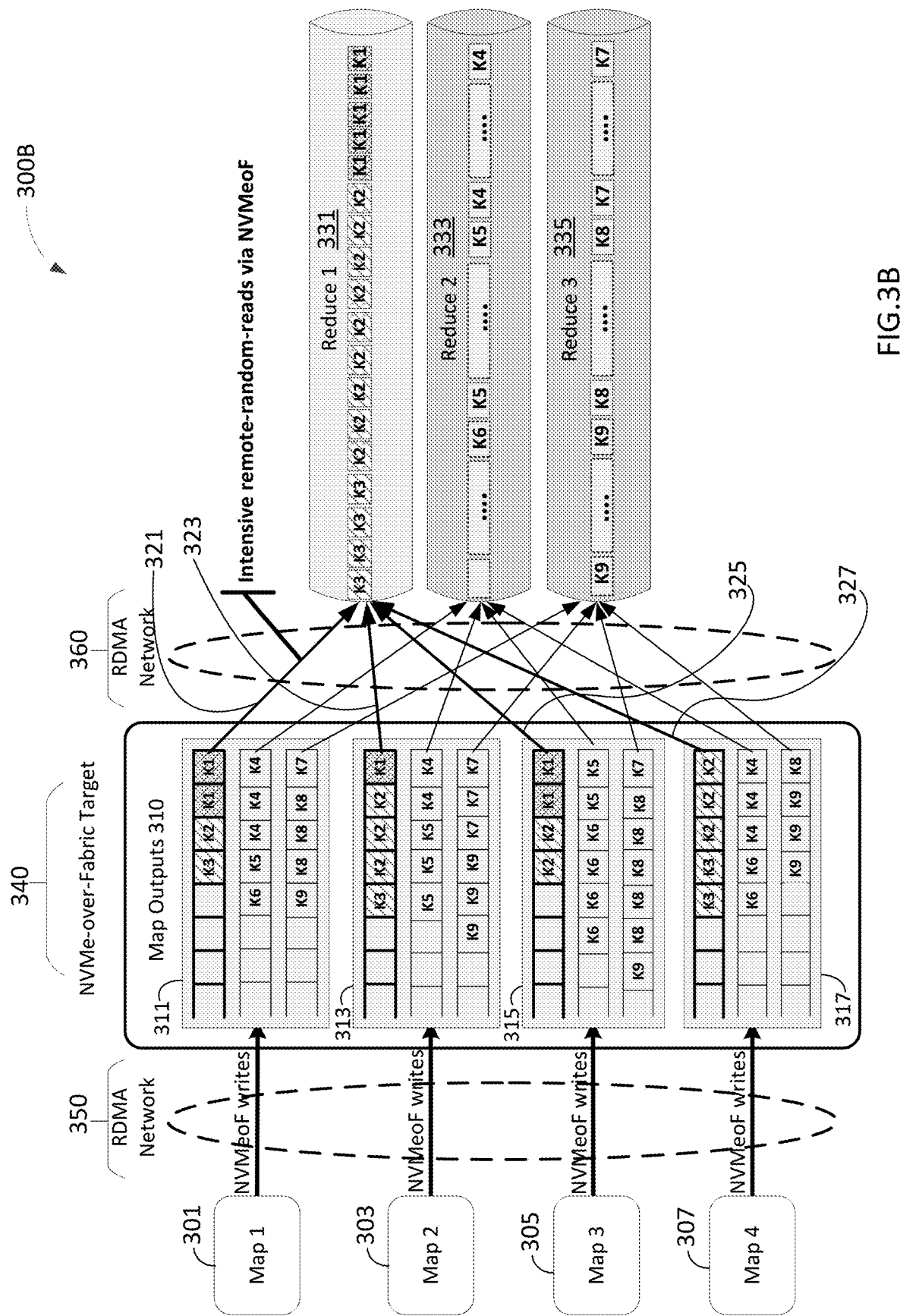
FIG. 3B illustrates an instantiation of the direct shuffle of FIG. 3A according to one embodiment.

It is may be appreciated that using the system of FIG. 1 or similar to it, a theoretical shuffle may be implemented, where each of the Map and the Reduce modules are provided in a server rack such as Server Rack 150, and where the output of the Maps is stored in Storage Racks 170. Using high performance solid state drives that include byte addressable random access non-volatile memory, and executing random reads/writes to and from them using advanced specifications, such as, for example, the Nonvolatile Memory Express (NVMe) Over Fabrics specification, described above, the theoretical shuffle may be achieved, and the full power of MapReduce programming realized. FIGS. 3A and 3B described below illustrate similar systems to that of FIG. 1A, but adapted to optimize MapReduce processing.

Before proceeding to the systems of FIGS. 3A and 3B, to facilitate understanding of conventional implementations of MapReduce and their limitations, next described is a typical example of a less than efficient shuffle implemented in a Hadoop® (MapReduce) framework, with reference to FIG. 2B.

In such compromised implementations, instead of retrieving <Key, Value> pairs one by one in a global order, as described above, each reduction module (e.g. a Hadoop® Reduce) actually retrieves the entire corresponding <Key, Value> pair queue at one time from each specific Map. The purpose of doing this is to change the random read I/Os at the map side to sequential read I/Os, so that a conventional infrastructure can handle the I/O.

As a result, an additional intermediate staging storage step has been created, known as merge and sort (e.g., a Hadoop® Merge-Sort), where all of the various map output queues are first accessed on a queue by queue basis, and then stored and sorted into a single queue at the Reduce side, in order to sort all the <key, value> pairs needed for a Reduce operation into a global order. Usually, such Merge-Sorts cannot be contained in main memory, but need to spill the data, as files, to storage accessible by the reduction modules.

FIG. 2B illustrates the merge and sort step. With reference thereto, FIG. 2B illustrates a Map Side 250, comprising Maps 1-4 201, 203, 205, 207, and Outputs of Maps 211, 213, 215 and 217, as described above in connection with FIG. 2A. The <key, value> data pairs stored in each of the Map Outputs are not transferred one by one, in a global order over all of the Map Outputs 211, 213, 215 and 217, but rather each queue, from each Map Output, corresponding to a single map, is first transferred to a Merge-Sort Intermediate Storage 230. In Merge-Sort Intermediate Storage 230 full queues are received, and then sorted into a globally correct order. Thus, with reference to FIG. 2B, for example, the top queues from each of Map Outputs 211, 213, 215, and 217 (containing data pairs comprising keys K1, K2 and K3) are transferred to Merge-Sort Intermediate Storage module 231, the transfers illustrated respectively by arrows 221, 223, 225, and 227. The queues are then stored, as shown at 236, in Merge-Sort Intermediate Storage module 231. Subsequently, the respective queues are combined. Thus, with reference to FIG. 2B, the upper queues from Map Outputs 211 and 212 are combined into combined queue 237. Combined queue 237 is then combined with the Map Output 215 from Map 205 to yield combined queue 238, and finally combined queue 238 is then combined with the Map Output 217 from Map 207 to yield combined queue 239. Finally, combined queue 239 is input into Reduce 1 241. A completely analogous process occurs in each of Merge-Sort Intermediate Storage modules 233 (for data pairs comprising keys K4, K5 and K6) and 235 (for data pairs comprising keys K7, K8 and K9), and shall not be described in detail.

It is noted that the merge and sort compromise has three disadvantages, which do not exist if a direct shuffle is performed. First, it requires additional time to execute Merge-Sorts at the Reduce side. Even worse, because very often there can be several spilled files (out of Merge-Sort Intermediate Storage modules, and into long term memory coupled to the reduction modules, because the files are too large to store in short term memory). The spilled files occur because it is further necessary to Merge-Sort many small files into a not too large number of large files. Otherwise, if the final Reduce phase had to access many small files, it would invoke heavy random-local-I/O at the Reduce side, which, again, could not work on the conventional storage infrastructure. Avoiding heavy random I/O, it should be recalled, was the very reason for performing the merge and sort operation in the first place. Thus, it takes even longer times to access the combined queues generated by the merge and sort step, because the reduction modules need to access the storage devices, rather than main memory, to input the combined queues.

It is here further noted that state-of-the-art implementations all still use heavy network stacks (e.g. HTTP over TCP/IP, etc.) to transport the queues from Maps to Reduces, which is not effective.

In addition to the additional time needed, the merge and sort compromise also has to store the spilled files at the Reduce side. Considering that people usually use expensive flash media (e.g., SSD) to store shuffle data in pursuit of better performance, such a double-storage—both at the Map and the Reduce sides—is not cost-effective to users.

In order to avoid file-spilling, users tend to allocate bigger memory space to each Reduce module, which requires an even higher investment in server memory. Alternatively, because available memory space is not sufficient to hold all of the data, users may increase the number of Reduce operations and decrease the amount of data every Reduce needs to handle, launching Reduces batch by batch. Although this can effectively avoid file-spilling, it still diminishes performance, because the Reduce phase extends to multiple batches. Moreover, in practice, this often also causes non-trivial overheads due to memory space cleanup from batch to batch, which is the case for the popular Java-based Big Data software implementations (including Spark, Hadoop®, and the like) that suffer performance penalties due to garbage collection activities. Moreover, this approach can also impact the Map side, which now must spend more time identifying which Reduce a given <key, value> queue corresponds to.

Finally, because shuffle storage is usually based on flash media (e.g., SSDs), this compromise downgrades the endurance of the flash media, because spilling to files at the Reduce side involve write operations to the flash media, and it is the repetitive write operations that cause flash media to wear out.

Thus, in embodiments, apparatus and methods to implement a direct shuffle may be provided. In embodiments, such apparatus may utilize solid state drives to store all map module output results, remote random access of the solid state drives through a network, using a non-volatile memory access over network specification, without using intermediate staging storage. Exemplary apparatus and associated methods are illustrated in FIGS. 3A and 3B, next described.

FIGS. 3A and 3B illustrate example systems with a similar structure to the generalized direct shuffle shown in FIG. 2A, and described above. With reference to FIG. 3A, beginning at the far left of the figure, there may be a set of map modules, Map 1 301, Map 2 303, Map 3 305 and Map 4 307. In embodiments, each map module may respectively operate on a set of local data to that map module, and may generate corresponding Map Outputs 311-317, each having one or multiple queues of <key, value> pairs. In embodiments, each queue of <key, value> pairs may be sorted in a local order, and then written to one of Map Outputs 310, which may each disposed in a Solid State Drive 340. In embodiments, the write operations to memory may be performed through remote random access of Solid State Drives 340, via Network 350, as shown in FIG. 3A, if Solid State Drive 340 is remote from Maps 1-4, 301, 303, 305, 307, as shown. If so, the remote random access of the solid state drive may use a non-volatile memory access over network specification, such as the NVMe over Fabrics 1.0 Gold specification, as shown by the NVMeoF writes from each of Maps 1-4 to each of Map Outputs 311, 313, 315 and 317, respectively. Alternatively, each map module may have an integrated solid state memory (this case not shown in FIG. 3A).

Considering Map Output 311, for example, it contains several queues of <key, value> pairs output by Map 1 301. The upper queue in Map Output 311 contains <key, value> pairs comprising keys K1, K2 and K3. As may be seen, Map Output 313, in its top queue, has a different set of <key, value> pairs than either Map Output 311, or Map Outputs 315 and 317, have in their respective top queue, even though each top queue holds data from only keys K1, K2 and K3. This is because each map operates on its own local data. However, as noted above, to perform a reduction operation, a reduce module must gather all of the <key, value> pairs, output by all of the map modules associated with a given key, say K1. As noted, this is the direct shuffle, where each reduction module remotely retrieves, from all of the map outputs, the corresponding <Key, Value> pairs to the reduction operation it is then performing one by one in a global order.

Illustrating this, continuing with reference to FIG. 3A, there are shown three reduction modules, each of them communicably coupled to all four of the Map Outputs 311, 313, 315 and 317. These reduction modules include Reduce 1 331, Reduce 2 333, and Reduce 3 335. As shown, for ease of illustration, Reduce 1 331 operates on <key, value> pairs having keys K1, K2 and K3, Reduce 2 333 operates on <key, value> pairs having keys K4, K5 and K6, and Reduce 3 335 operates on <key, value> pairs having keys K7, K8 and K9. Taking as an example Reduce 1 331, to perform its reduction operation Reduce 1 331 accesses the top queue of <key, value> pairs from each of Map Outputs 311, 313, 315 and 317, in a global order for each key. This is illustrated by arrows 321, 323, 325, and 327, which indicate memory transfers from the respective Map Outputs 311, 313, 315 and 317, all to Reduce 1 331. In embodiments, the <key, value> pairs are accessed in global order, which means that all of the <key, value> pairs comprising key K1 are accessed, in order, from each Map Output, before Reduce 1 begins accessing the <key, value> pairs indexed by key K2, and so on for keys K2 and K3. Each of Reduce 2 333 and Reduce 3 335 does the same access of <key, value> pairs, from all Map Outputs, in global order. In embodiments, this is possible because, as shown, each Map may remotely write its locally-sorted queues into a shared and high-performance storage, Solid State Drives 340. Then, because this storage can offer extremely high remote-random-I/O, each Reduce can remotely retrieve every <Key, Value> pair one by one in a global order from this storage, without needing to use intermediate staging storage, as described above in connection with FIG. 2B.

Thus, in embodiments, Maps 1 through 4, 301 through 307, may be provided in several physical servers (without NVMe solid state devices), and Solid State Drives 340 may comprise a single server, with many NVMe solid state drives. Solid State Drives 340 may be provided in a data center, for example, or in several distributed data centers connected through a fabric. Additionally, reduce modules Reduce 1 through Reduce 3, 331-335, may be provided in several physical servers, also without NVMe solid state drives. The various Map servers, and the various Reduce servers, may all be connected via Ethernet, or alternatively, the Map servers and the Reduce servers may be respectively provided on the same physical machines.

FIG. 3B illustrates a instantiation 300B of the example system of FIG. 3A where the Maps and the Reduces are connected to an NVMe-over-Fabric Target 340, which may include several NVMe SSDs. In embodiments, the SSDs may include 3D Xpoint storage media. The Maps and the Reduces are connected to the NVMe-over-Fabric Target 340 through RDMA Networks 360. In all other respects, FIG. 3B is equivalent to FIG. 3A, and shall not be described further. As in the case of FIG. 3A, the Maps store their respective outputs in NVMe-over-Fabric Target 340 via numerous NVMeoF writes, and the Reduces execute intensive remote-random reads via NVMeoF. In embodiments, one or both of Maps 301 through 307, and Reduces 331 through 335, may be provided in a data center together with NVMe-over-Fabric Target 340, where the RDMA network connects modules within the data center. Alternatively, in embodiments, the example system of FIG. 3B may be distributed across multiple data centers.

It is noted that in experiments performed by the inventors, a NVMe-over-Fabric solution, comprised of a NVMe-over-Fabric compliant memory access protocol, 40 Gb RDMA over Ethernet, and high-performance NVMe drives, provided remote random access of the solid state memory that is very close to what NVMe drives can offer locally, namely hundreds of thousands of input/output operations per second (IOPS). The same experiments showed that the example systems of FIGS. 3A and 3B offer several performance advantages. Implementations of map and reduce operations using state-of-the-art Hadoop® and Spark systems, even with high-performance NVMe drives used for local shuffle data storage, ran slower than a direct shuffle implementation as shown in FIGS. 3A and 3B.

This is believed to be for several reasons. First, all of the time-consuming merge and sort operations at the reduce side were eliminated, as were remote random I/O bottlenecks at the map side. Second, lightweight RDMA networks were used. Thus, although the inventive implementations of FIGS. 3A and 3B use two network transportations, from the Maps to Solid State Memory and then from the Solid State Memory to the Reduces, it was seen to be still more effective than conventional network solutions.

Finally, it is noted that as a matter of cost and endurance, because embodiments do not need intermediate staging (merge and sort) at the reduce side, and thus eliminates any spilling-to-files, it saves storage space for the shuffle phase, and, as noted, also improves the endurance of flash media.

It is noted that according to the definition of a shuffle phase, when each map writes <key, value> pairs into its own storage space, there should be no other map operations or reduction operations that need to access that space at the same time. In another words, synchronization is being done by upper-layer applications (e.g., MapReduce, Spark engine, or the like). Based on this, in embodiments, a specific library may be provided, between upper-layer applications and a NVMe storage driver, which exposes APIs for the applications to access the NVMe compliant storage devices (or, more accurately, the remote NVMe compliant storage devices emulated via NVMeoF).

In embodiments, this library may provide three types of Application Programming Interfaces (APIs), as follows. First, allocation and de-allocation APIs, for each mapping module to allocate a dedicated storage space from, or return to, the corresponding storage devices. Second, write APIs, for each map to write a payload into a storage space. Finally, third, read APIs, for each reduction module to read a payload from a storage space.

In embodiments, given such a library, a mechanism may be provided to organize the <key, value> pairs on the storage space, for example a NVMe SSD, or other solid state memory, as shown in FIGS. 3A and 3B, so that the behavior of maps (writes) and reduces (reads) may match the characteristics of the underlying storage infrastructure (e.g., flash based media). Such a mechanism is next described with reference to FIG. 4.

Figure 4:
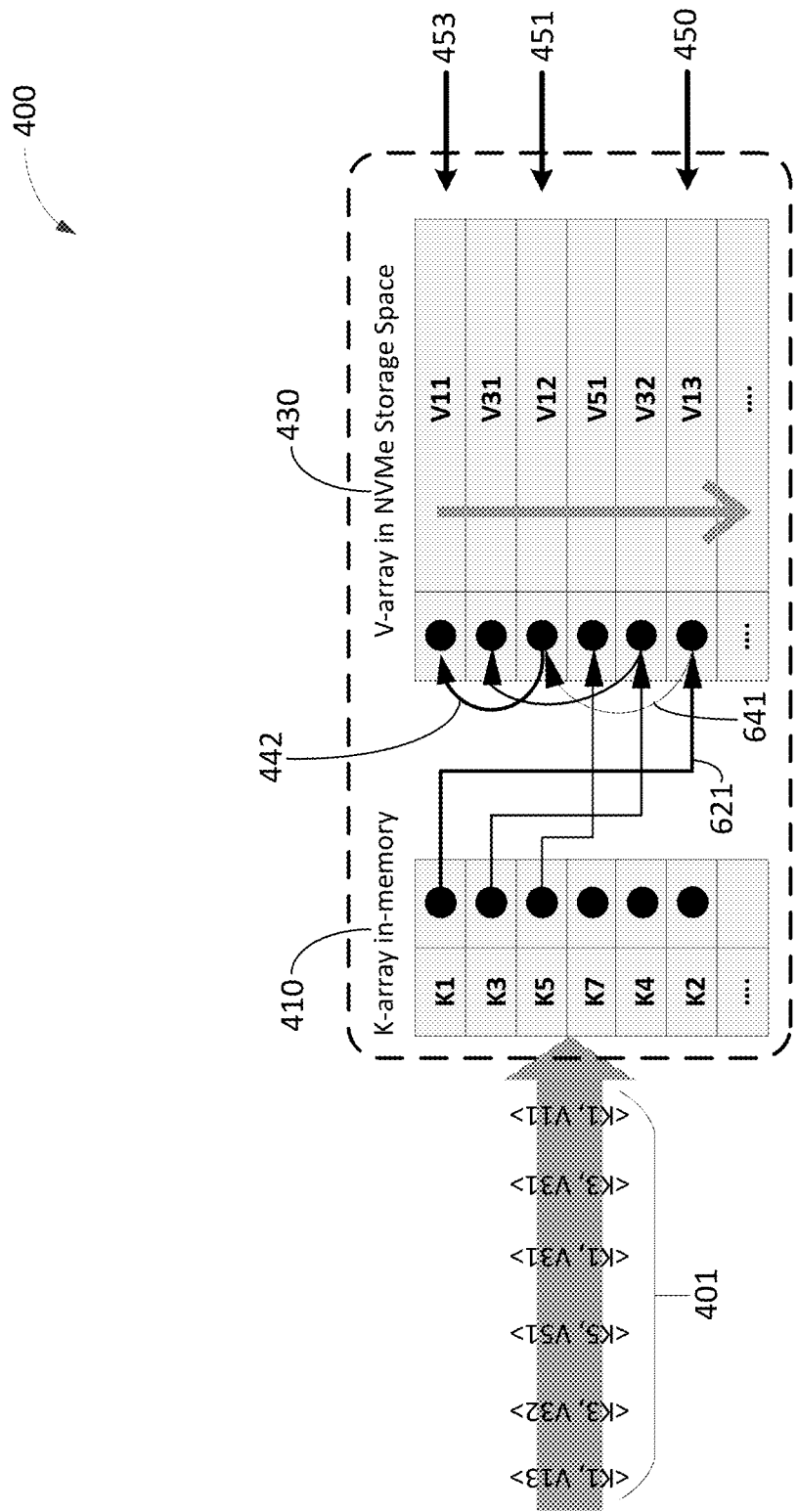
FIG. 4 illustrates creation of a key array in a memory of a mapping module and a value array in a solid state memory coupled to the mapping module in accordance with various embodiments.

FIG. 4 illustrates how, in embodiments, a map may write its <key, value> pairs into the allocated storage space. In embodiments, each map may maintain a sequential array, called a V-array 430, in the solid state memory, or NVMe storage space in FIG. 4. Each element of V-array 430 may comprise two fields: the index of another element that stores the <Value> of a previous <Key, Value> pair, Vpriorindex, and the <Value> of a current <Key, Value> pair. At the same time, each map may also maintain another sequential array, called a K-array 410, in its associated (local) memory, of which each element also consists of two fields: every unique <Key>, and an index to the element in the V-array 430, Vindex, that stores the <Value> of the latest <Key, Value> pair having that specific <Key>. In embodiments, in this way, if one were to go through the K-array of a mapping module, it would be able to retrieve all of the <Value>'s that have been produced by this mapping module by navigating all of the indices.

For example, in FIG. 4, starting from the first element of K-array 410, one may retrieve all of the <Values>, e.g., V13, V12, and V11, corresponding to the <K1> key, as follows. Taking the first element of K-array 410, <K1, Vindex>, Vindex points to the element of V-array 430 stored in the remote solid state drive that has the last entered <Value> for key K1, namely V13 (location 450). This is shown by arrow 421 which indicates the Vindex of the first (top) element of K-array 410 pointing to location 450 in V-array 430. Once this location 450 of V-array 430 is accessed, the first field at location 450 is Vpriorindex. Vpriorindex points to location 451, which contains the next to last entered Value for key K1, here V12. By moving to location 451 in V-array, illustrated by curved arrow 441, one finds the Vindex there to point to location 453, which has the first entered Value for key K1, here V11. Moving to location 453 is illustrated by curved arrow 442. At location 453, the value of Vpriorindex is NULL, as V11 is the first entry for key K1, and there is no earlier location to point to.

An analogous relationship between elements of K-array 410 and V-array 430 exists for each of the values for keys K3, K5, K7, etc. Thus, a reduction module may readily find all of the <Key, Value> pairs for key K1, and at the same time a mapping module may execute sequential memory writes of the sequence of <Key, Value> pairs 401, as shown in FIG. 4.

In embodiments, once the map finishes, it may write the K-array to the storage space as well, to make it accessible to all the reduce modules, and then notify an application master (e.g. a MapReduce job tracker, or Spark driver) of its completion by providing the location information of its K-array and V-array. After that, the application master may provide that location information to all of the reduction modules. Finally, once all of the maps have completed, all the reduction modules may begin to simultaneously retrieve the corresponding <Value>'s from all of the Maps' storage spaces.

In embodiments, a key advantage of this mechanism is that the I/O behavior may match the performance characteristics of the underlying storage infrastructure: the operations at the map side are small and sequential writes, while those at the reduce side are small and random reads. Both match what flash-based media are good at. This relates to the endurance of NAND flash storage. NAND flash has greater endurance to sequential writes than it does for random ones. Thus, it is beneficial to have a mapping module write its output as sequentially as possible. On the other hand, for memory reads, there is no endurance concern. Thus reduction modules may read the remote solid state memory randomly.

Figure 5A:
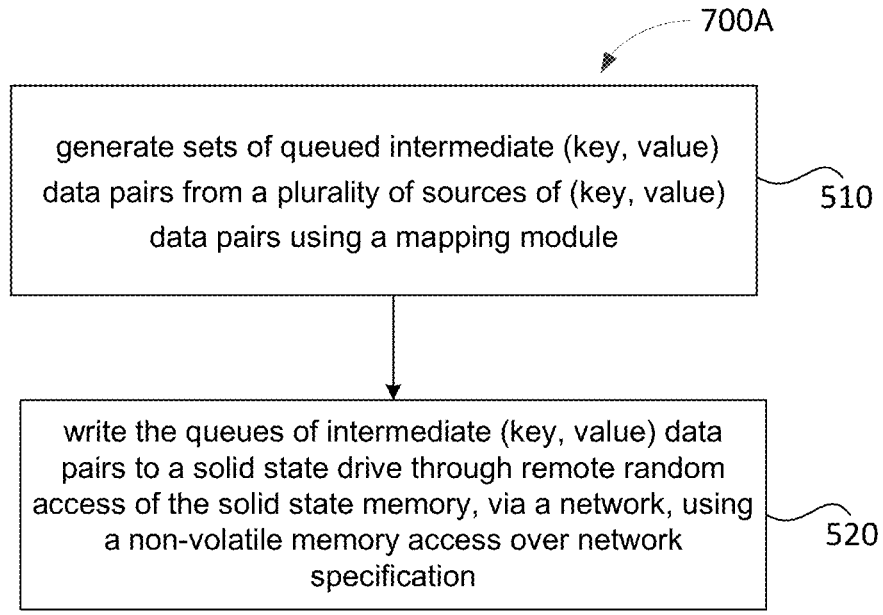
FIG. 5A illustrates an overview of the operational flow of a process for generating sets of queued intermediate (key, value) data pairs from a plurality of sources of (key, value) data pairs using a mapping module, and writing the queues of intermediate (key, value) data pairs to a solid state memory through remote random access of the solid state memory, via a network, using a non-volatile memory access over network protocol, in accordance with various embodiments.

Referring now to FIG. 5A, an overview of operational flow for a process for generating sets of queued intermediate (key, value) data pairs from a plurality of sources of (key, value) data pairs, and writing the queues of intermediate (key, value) data pairs to a solid state drive through remote random access of the solid state drive, via a network, using a non-volatile memory access over network specification in accordance with various embodiments, is illustrated. The process of FIG. 5A may be performed by a mapping module, such as any of Maps 1-4 of FIGS. 3A and 3B, which may be implemented as computer device 700 depicted in FIG. 7.

As illustrated, process 500A may include operations performed at blocks 510-520. Process 500A may begin at block 510. At block 510 sets of queued intermediate (key, value) data pairs from a plurality of sources of (key, value) data pairs may be generated using e.g., a mapping module. From block 510 process 500A may proceed to block 520, where the queues of intermediate (key, value) data pairs may be written to a solid state drive through remote random access of the solid state drive, via a network, using a non-volatile memory access over network specification. At block 520, process 500A may terminate.

Figure 5B:
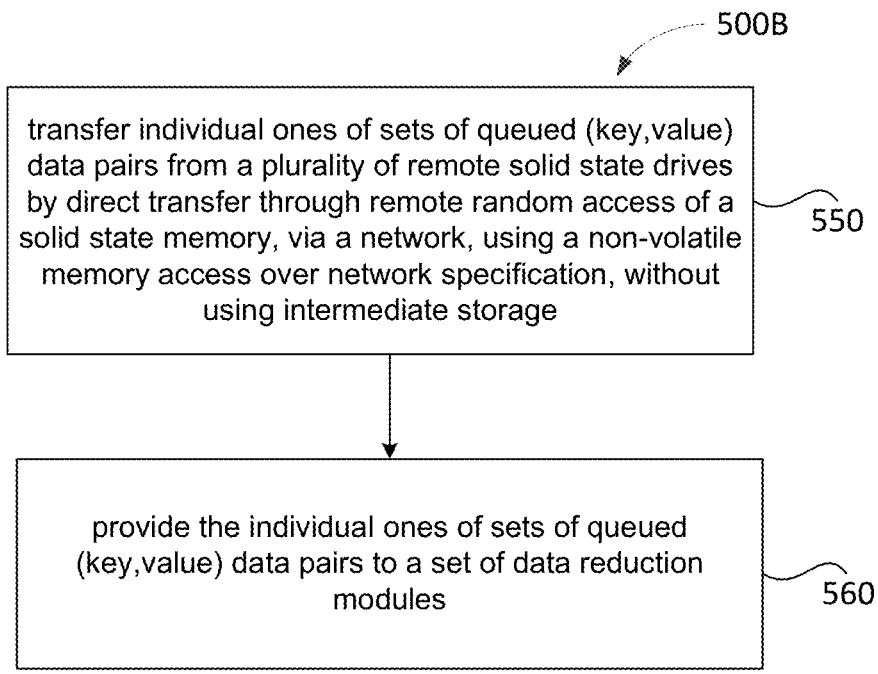
FIG. 5B illustrates an overview of the operational flow of a process for transferring individual ones of sets of queued (key, value) data pairs from a plurality of solid state memory by direct transfer using a non-volatile memory access over network protocol in accordance with various embodiments.

Referring now to FIG. 5B, an overview of operational flow for a process for transferring individual ones of sets of queued (key, value) data pairs from a plurality of solid state drives by direct transfer using a non-volatile memory access over network specification in accordance with various embodiments, is illustrated. The process of FIG. 5B may be performed by a reduction module, such as any of Reduce 1-3, 331, 333, 335, of FIGS. 3A and 3B, which may be implemented as computer device 700 depicted in FIG. 7.

As illustrated, process 500B may include operations performed at blocks 550-560. Process 500B may begin at block 550. At block 550 individual ones of sets of queued (key, value) data pairs from a plurality of remote solid state drives may be transferred by direct transfer through remote random access of the solid state drives, via a network, using a non-volatile memory access over network specification, without using intermediate storage. From block 550 process 500B may proceed to block 560, where the individual ones of the sets of queued (key, value) data pairs may be provided to a set of data reduction modules. At block 560, process 500B may terminate.

Figure 6:
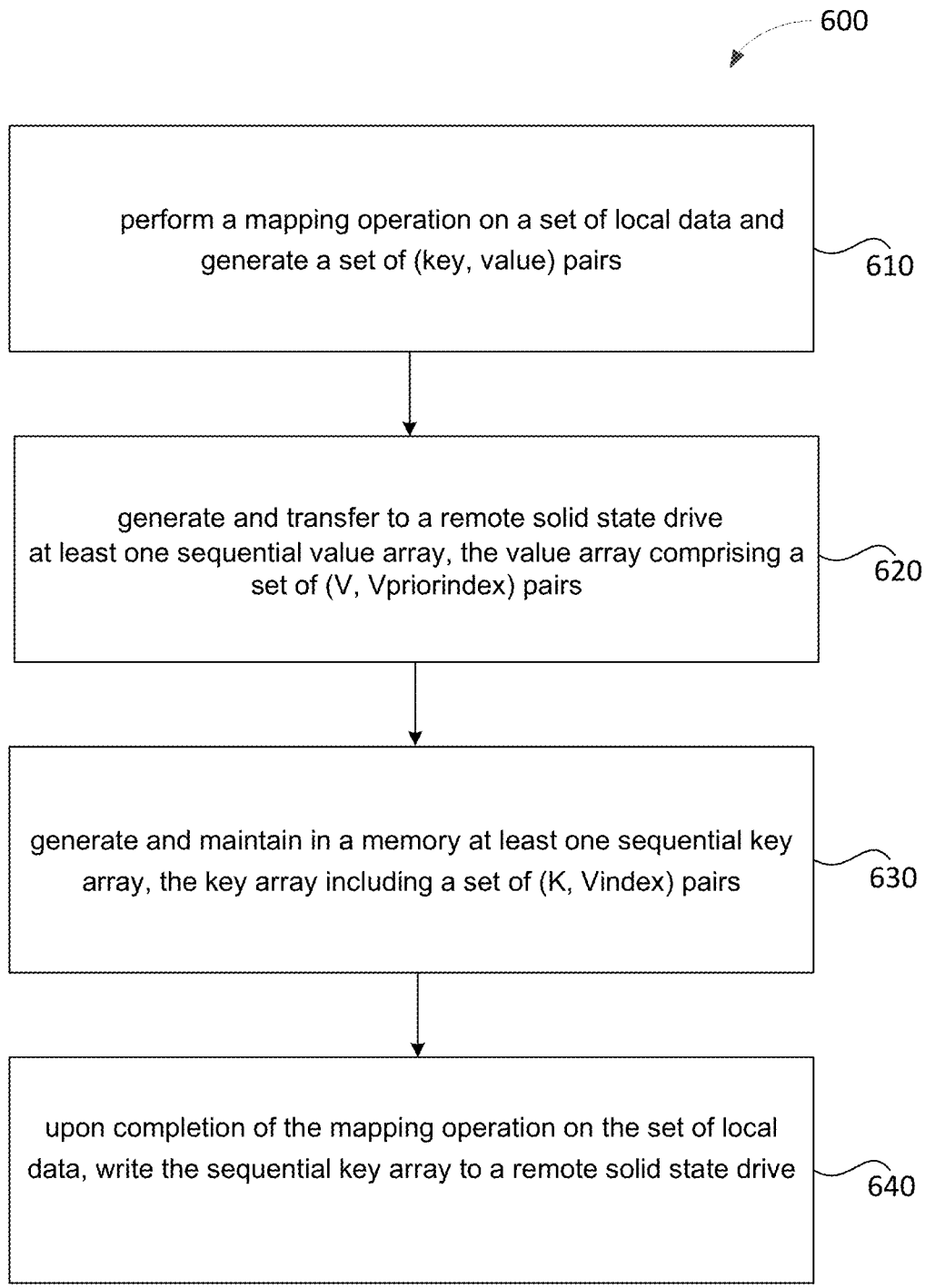
FIG. 6 illustrates an overview of the operational flow of a process for performing a mapping operation on a set of local data, generating and transferring a sequential value array and generating and maintaining a sequential key array, in accordance with various embodiments.

Referring now to FIG. 6, an overview of operational flow for a process for performing a mapping operation on a set of local data, generating and transferring a sequential value array and generating and maintaining a sequential key array, in accordance with various embodiments, is illustrated.

As illustrated, process 600 may include operations performed at blocks 610-640. The operations at blocks 610-640 may be performed e.g., by a mapper, or mapping module, which may be implemented as a computing apparatus, as shown in FIG. 7.

Process 600 may begin at block 610. At block 610 the mapping module may perform a mapping operation on a set of local data and generate a set of (key, value) pairs. From block 610 process 600 may proceed to block 620, where it may generate and transfer to a remote solid state drive at least one sequential value array, the value array comprising a set of (V, Vpriorindex) pairs, where V is the value of a current <key, value> pair, and Vpriorindex is an index of a prior element of the sequential value array that stores the value of a previous (key, value) pair for the same key. From block 620, process 600 may proceed to block 630, where process 600 may generate and maintain in a memory at least one sequential key array, the key array including a set of (K, Vindex) pairs, where K is a unique key, and Vindex is an index of an element in the value array that stores the value of the latest (key, value) pair for the same key.

From block 630, process 600 may proceed to block 640, where process 600 may, upon completion of the mapping operation on the set of local data, write the sequential key array to a remote solid state drive. At block 640, process 600 may then terminate.

Figure 7:
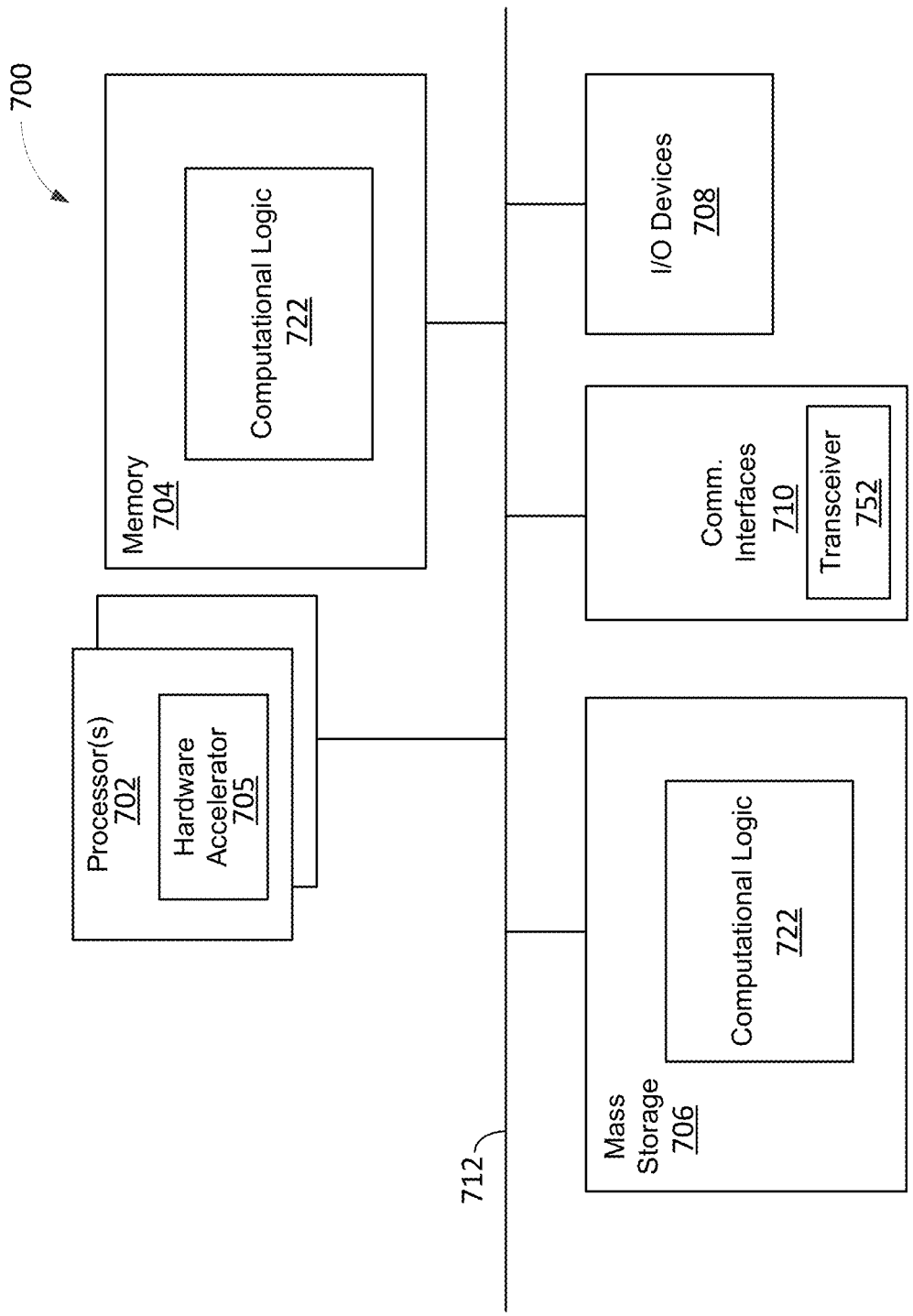
FIG. 7 illustrates a block diagram of a computer device suitable for practicing the present disclosure, in accordance with various embodiments.

Referring now to FIG. 7, wherein a block diagram of a computer device suitable for practicing the present disclosure, in accordance with various embodiments, is illustrated. As shown, computer device 700 may include one or more processors 702, memory controller 703, and system memory 704. Each processor 702 may include one or more processor cores and/or hardware accelerator 705. An example of hardware accelerator 705 may include, but is not limited to, programmed field programmable gate arrays (FPGA). Memory controller 703 may be any one of a number of memory controllers known in the art. System memory 704 may include any known volatile or non-volatile memory.

Additionally, computer device 700 may include mass storage device(s) 706 (such as solid state drives), input/output device interface 708 (to interface with various input/output devices, such as, mouse, cursor control, display device (including touch sensitive screen), and so forth) and communication interfaces 710 (such as network interface cards, modems and so forth). In embodiments, communication interfaces 710 may include transceiver 752 that supports wired or wireless communication, including near field communication. The elements may be coupled to each other via system bus 712, which may represent one or more buses. In the case of multiple buses, they may be bridged by one or more bus bridges (not shown).

Each of these elements may perform its conventional functions known in the art. In particular, system memory 704 and mass storage device(s) 706 may be employed to store a working copy and a permanent copy of the executable code of the programming instructions of an operating system, one or more applications, a mapping module such as Map 1-4, 301, 303, 305 or 307, or a reduction module such as Reduce 1-3, 331, 333 and 335, collectively referred to as computing logic 722. Map 1-4, 301, 303, 305 or 307 may be configured to practice (aspects of) processes 500A and 600 of FIGS. 5A and 6, respectively. Reduce 1-3, 331, 333 and 335 may be configured to practice (aspects of) process 500B of FIG. 5B. The programming instructions may comprise assembler instructions supported by processor(s) 702 or high-level languages, such as, for example, C, that can be compiled into such instructions. In embodiments, some of computing logic may be implemented in hardware accelerator 705.

The permanent copy of the executable code of the programming instructions or the bit streams for configuring hardware accelerator 705 may be placed into permanent mass storage device(s) 706 in the factory, or in the field, through, for example, a distribution medium (not shown), such as a compact disc (CD), or through communication interface 710 (from a distribution server (not shown)).

The number, capability and/or capacity of these elements 710-712 may vary, depending on the intended use of example computer device 700, e.g., whether example computer device 700 is a smartphone, tablet, ultrabook, a laptop, a server, a set-top box, a game console, a camera, and so forth. The constitutions of these elements 710-712 are otherwise known, and accordingly will not be further described.

Figure 8:
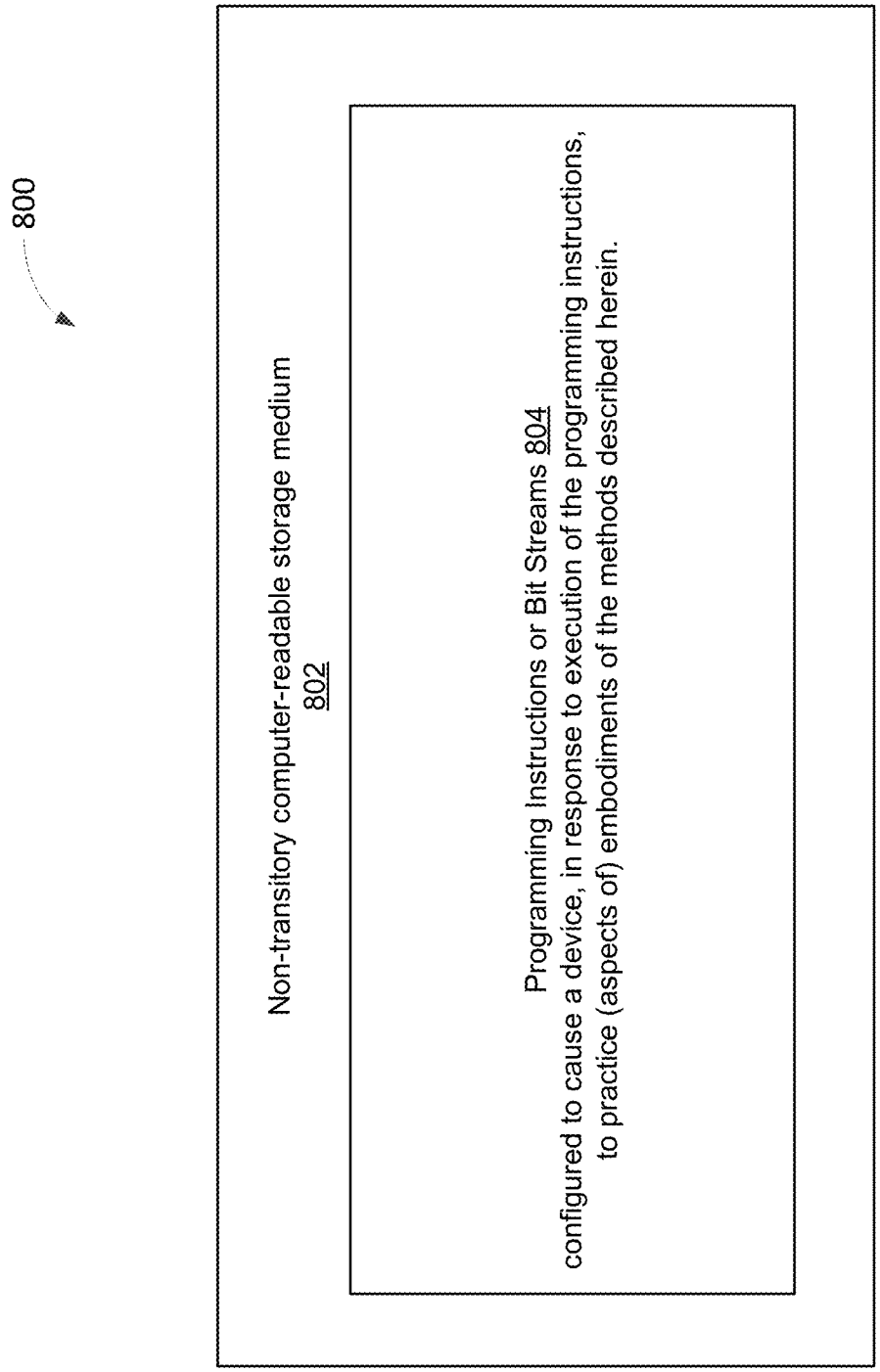
FIG. 8 illustrates an example computer-readable storage medium having instructions configured to practice aspects of the processes of FIGS. 5A, 5B and 6, in accordance with various embodiments.

FIG. 8 illustrates an example computer-readable storage medium having instructions configured to implement all (or portion of) a mapping module such as Map 1-4, 301, 303, 305 or 307, or a reduction module such as Reduce 1-3, 331, 333 and 335, and/or practice (aspects of) processes performed by 500A, 500B and 600 of FIGS. 5A, 5B and 6, respectively, earlier described, in accordance with various embodiments. As illustrated, computer-readable storage medium 802 may include the executable code of a number of programming instructions or bit streams 804. Executable code of programming instructions (or bit streams) 804 may be configured to enable a device, e.g., computer device 700, in response to execution of the executable code/programming instructions (or operation of an encoded hardware accelerator 705), to perform (aspects of) processes 500A, 500B and 600 of FIGS. 5A, 5B and 6, respectively. In alternate embodiments, executable code/programming instructions/bit streams 804 may be disposed on multiple non-transitory computer-readable storage medium 802 instead. In embodiments, computer-readable storage medium 802 may be non-transitory. In still other embodiments, executable code/programming instructions 804 may be encoded in transitory computer readable medium, such as signals.

Referring back to FIG. 7, for one embodiment, at least one of processors 702 may be packaged together with a computer-readable storage medium having some or all of computing logic 722 (in lieu of storing in system memory 704 and/or mass storage device 706) configured to practice all or selected ones of the operations earlier described with references to FIGS. 5A, 5B and 6. For one embodiment, at least one of processors 702 may be packaged together with a computer-readable storage medium having some or all of computing logic 722 to form a System in Package (SiP). For one embodiment, at least one of processors 702 may be integrated on the same die with a computer-readable storage medium having some or all of computing logic 722. For one embodiment, at least one of processors 702 may be packaged together with a computer-readable storage medium having some or all of computing logic 722 to form a System on Chip (SoC). For at least one embodiment, the SoC may be utilized in, e.g., but not limited to, a hybrid computing tablet/laptop.

Illustrative examples of the technologies disclosed herein are provided below. An embodiment of the technologies may include any one or more, and any combination of, the examples described below.

Example 1 may include an apparatus for computing, comprising: a set of data reduction modules to perform data reduction operations on sets of (key, value) data pairs to reduce an amount of values associated with a shared key, wherein the (key, value) data pairs are stored in a plurality of queues located in a plurality of solid state drives remote from the apparatus; and a memory access module, communicably coupled to the set of data reduction modules, to directly transfer individual ones of the sets of queued (key, value) data pairs from the plurality of remote solid state drives through remote random access of the solid state drives, via a network, without using intermediate staging storage.

Example 2 may include the apparatus of example 1, and/or other examples herein, wherein the apparatus further comprises a programming framework that supports the processing and distributed storage of very large data sets, and the data reduction operations are part of a Reduce operation under the framework.

Example 3 may include the apparatus of example 1, and/or other examples herein, wherein the sets of queued (key, value) data pairs are intermediate (key, value) data pairs generated from a plurality of sources of (key, value) data pairs by a mapper on a computer system remote to the apparatus, communicably coupled to the remote solid state drives.

Example 4 may include the apparatus of example 3, and/or other examples herein, wherein the mapper is part of a Map module under a programming framework that supports the processing and distributed storage of very large data sets.

Example 5 may include the apparatus of example 1, and/or other examples herein, wherein the (key, value) data pairs stored in the plurality of queues are stored in a local order indexed by the keys.

Example 6 may include the apparatus of any one of examples 1-5, and/or other examples herein, wherein the remote solid state drives include byte-addressable random access non-volatile memory.

Example 7 may include the apparatus of example 1, and/or other examples herein, wherein the memory access module is further to, for each data reduction module: transfer, from selected ones of the plurality of queues located in the plurality of remote solid state drives, (key, value) data pairs in a global order.

Example 8 may include the apparatus of example 6, and/or other examples herein, wherein the transfer in a global order includes transfer of all (key, value) pairs corresponding to a key Kn from the selected ones of the plurality of queues, prior to transfer of any (key, value) pairs whose key value is greater than Kn.

Example 9 may include the apparatus of example 1, and/or other examples herein, wherein the memory access module transfers the individual ones of the sets of queued (key, value) data pairs from the plurality of remote solid state drives using unsynchronized raw block device accesses pursuant to a non-volatile memory access over network specification.

Example 10 may include the apparatus of example 1, and/or other examples herein, wherein each of the set of data reduction modules performs a single specific reduce operation at a point in time.

Example 11 may include a method to be performed by a computer, comprising transferring, by a memory access module, individual ones of sets of queued (key, value) data pairs from a plurality of solid state drives remote from the computer, in which the (key, value) data pairs are stored in a plurality of queues, by direct transfer through remote random access of the solid state drives, via a network, without using intermediate staging storage; and providing the individual ones of sets of queued (key, value) data pairs to a set of data reduction modules communicably connected to the memory access module.

Example 12 may include the method of example 11, and/or other examples herein, wherein the memory access module transfers the individual ones of the sets of queued (key, value) data pairs from the plurality of remote solid state drives using unsynchronized raw block device accesses pursuant to a non-volatile memory access over network specification.

Example 13 may include the method of example 11, and/or other examples herein, wherein the data reduction modules perform data reduction operations on sets of (key, value) data pairs to reduce an amount of values associated with a shared key.

Example 14 may include the method of example 13, and/or other examples herein, wherein the computer further comprises a programming framework that supports the processing and distributed storage of very large data sets, and the data reduction modules are part of a Reduce operation under the framework.

Example 15 may include the method of example 11, and/or other examples herein, wherein the sets of queued (key, value) data pairs are intermediate (key, value) data pairs generated from a plurality of source of (key, value) data pairs by a mapper on a computer system remote to the computer, coupled to the remote solid state drives.

Example 16 may include the method of example 14, and/or other examples herein, wherein the mapper implements a Map operation under the framework.

Example 17 may include the method of example 11, and/or other examples herein, wherein the remote solid state drives include byte-addressable random access non-volatile memory.

Example 18 may include the method of example 11, and/or other examples herein, wherein the queued (key, value) data pairs stored in the plurality of remote solid state drives are stored in a local order indexed by the keys.

Example 19 may include the method of any one of examples 11-18, and/or other examples herein, wherein the transferring includes: transferring, from selected ones of the plurality of queues located in the plurality of remote solid state drives, a set of (key, value) pairs in a global order, and wherein the transferring in a global order includes transferring all (key, value) pairs corresponding to a key Kn from the selected ones of the plurality of queues, prior to transferring any (key, value) pairs whose key value is greater than Kn.

Example 20 may include an apparatus for computing, comprising: a mapper module to perform mapping operations on sets of (key, value) pairs to map an amount of values to a shared key to generate a set of (key, value) pairs; a memory write module, communicably connected to the mapper module, to transfer data via a non-volatile memory access over network protocol from the mapper module to a remote solid state drive through remote random access; and a memory. The apparatus may further include a memory management module, communicably coupled to the memory and the memory write module, to generate and write into the remote solid state drive: at least one sequential value array, the value array comprising a set of (V, Vpriorindex) pairs, where: V is the value of a current (key, value) pair, and Vpriorindex is an index of a prior element of the sequential value array that stores the value of a previous (key, value) pair for the same key.

Example 21 may include the apparatus of example 20, and/or other examples herein, wherein the memory management module is further to generate and write into the memory: at least one sequential key array, the key array including a set of (K, Vindex) pairs, where: K is a unique key, and Vindex is an index of an element in the value array that stores the value of the latest (key, value) pair for the same key.

Example 22 may include the apparatus of example 20, and/or other examples herein, wherein the memory management module is further to, upon the mapper module completing a mapping operation on a set of input data, write the sequential key array to the solid state memory.

Example 23 may include the apparatus of any one of examples 20-22, and/or other examples herein, wherein the value of Vpriorindex for the first (V, Vpriorindex) pair for each key in the sequential value array is null.

Example 24 may include one or more non-transitory computer-readable storage media comprising a plurality of instructions that, in response to being executed, cause a computing device to: perform a mapping operation on a set of local data and generate a set of (key, value) pairs; transfer data from the mapper module to a remote solid state drive through remote random access; and generate and transfer to the remote solid state drive: at least one sequential value array, the value array comprising a set of (V, Vpriorindex) pairs, where: V is the value of a current (key, value) pair, and Vpriorindex is an index of a prior element of the sequential value array that stores the value of a previous (key, value) pair for the same key.

Example 25 may include the one or more non-transitory computer-readable storage media of example 24, and/or other examples herein, wherein the plurality of instructions, in response to being executed, further cause the computing device to: generate and maintain in a memory of the computing device: at least one sequential key array, the key array including a set of (K, Vindex) pairs, where: K is a unique key, and Vindex is an index of an element in the value array that stores the value of the latest (key, value) pair for the same key.

Example 26 may include the one or more non-transitory computer-readable storage media of example 25, and/or other examples herein, wherein the plurality of instructions, in response to being executed, further cause the computing device to: upon completion of the mapping operation on the set of local data, write the sequential key array to the remote solid state drive.

Example 27 may include the one or more non-transitory computer-readable storage media of any one of examples 24-26, and/or other examples herein, wherein the value of Vpriorindex for the first (V, Vpriorindex) pair for each key in the sequential value array is null.

Example 28 may include one or more non-transitory computer-readable storage media comprising a plurality of instructions that, in response to being executed, cause a computing device to: transfer, by a memory access module, individual ones of sets of queued (key, value) data pairs from a plurality of solid state drives remote from the computer, in which the (key, value) data pairs are stored in a plurality of queues, by direct transfer through remote random access of the solid state drives, via a network, without using intermediate staging storage; and provide the individual ones of sets of queued (key, value) data pairs to a set of data reduction modules communicably connected to the memory access module.

Example 29 may include the one or more non-transitory computer-readable storage media of example 28, and/or other examples herein, wherein the memory access module transfers the individual ones of the sets of queued (key, value) data pairs from the plurality of remote solid state drives using unsynchronized raw block device accesses pursuant to a non-volatile memory access over network specification.

Example 30 may include the one or more non-transitory computer-readable storage media of example 28, and/or other examples herein, wherein the data reduction modules perform data reduction operations on sets of (key, value) data pairs to reduce an amount of values associated with a shared key.

Example 31 may include the one or more non-transitory computer-readable storage media of example 30, and/or other examples herein, wherein the computing device further comprises a programming framework that supports the processing and distributed storage of very large data sets, and the data reduction operations are part of a Reduce operation under the framework.

Example 32 may include the one or more non-transitory computer-readable storage media of example 28, and/or other examples herein, wherein the sets of queued (key, value) data pairs are intermediate (key, value) data pairs generated from a plurality of source of (key, value) data pairs by a mapper on a computing device remote to the computing device, coupled to the remote solid state drives.

Example 33 may include the one or more non-transitory computer-readable storage media of example 31, and/or other examples herein, wherein the mapper is part of a Map module under a programming framework that supports the processing and distributed storage of very large data sets.

Example 34 may include the one or more non-transitory computer-readable storage media of example 29, and/or other examples herein, wherein the remote solid state drives include byte-addressable random access non-volatile memory.

Example 35 may include the one or more non-transitory computer-readable storage media of example 28, and/or other examples herein, wherein the queued (key, value) data pairs stored in the plurality of remote solid state drives are stored in a local order indexed by the keys.

Example 36 may include the one or more non-transitory computer-readable storage media of any one of examples 28-35, and/or other examples herein, wherein the transfer includes: a transfer, from selected ones of the plurality of queues located in the plurality of remote solid state memory, of a set of (key, value) pairs in a global order, and wherein the transfer in a global order includes transfer of all (key, value) pairs corresponding to a key Kn from the selected ones of the plurality of queues, prior to transfer of any (key, value) pairs whose key value is greater than Kn.

Example 37 may include apparatus for computing, comprising: means for transferring, by a memory access module, individual ones of sets of queued (key, value) data pairs from a plurality of solid state drives remote from the computer, in which the (key, value) data pairs are stored in a plurality of queues, by direct transfer through remote random access of the solid state memory, via a network, without using intermediate staging storage; and means for providing the individual ones of sets of queued (key, value) data pairs to a set of data reduction modules communicably connected to the memory access module.

Example 38 may include the apparatus for computing of claim 37, and/or other examples herein, wherein the means for transferring transfers the individual ones of the sets of queued (key, value) data pairs from the plurality of remote solid state drives using unsynchronized raw block device accesses pursuant to a non-volatile memory access over network specification.

Example 39 may include the apparatus for computing of example 37, and/or other examples herein, wherein the data reduction modules perform data reduction operations on sets of (key, value) data pairs to reduce an amount of values associated with a shared key.

Example 40 may include the apparatus for computing of example 39, and/or other examples herein, wherein the apparatus for computing further comprises a programming framework that supports the processing and distributed storage of very large data sets, and the data reduction modules are part of a Reduce operation under the framework.

Example 41 may include the apparatus for computing of example 37, and/or other examples herein, wherein the sets of queued (key, value) data pairs are intermediate (key, value) data pairs generated from a plurality of source of (key, value) data pairs by a mapper on an apparatus for computing system remote to the apparatus for computing, coupled to the remote solid state memory.

Example 42 may include the apparatus for computing of example 40, and/or other examples herein, wherein the mapper is part of a Map module under the framework.

Example 43 may include the apparatus for computing of example 37, and/or other examples herein, wherein the remote solid state drives include byte-addressable random access non-volatile memory.

Example 44 may include the apparatus for computing of example 37, and/or other examples herein, wherein the queued (key, value) data pairs stored in the plurality of remote solid state drives are stored in a local order indexed by the keys.

Example 45 may include the apparatus for computing of any one of examples 37-44, and/or other examples herein, wherein the means for transferring includes means for transferring, from selected ones of the plurality of queues located in the plurality of remote solid state drives, a set of (key, value) pairs in a global order, and wherein the transferring in a global order includes transferring all (key, value) pairs corresponding to a key Kn from the selected ones of the plurality of queues, prior to transferring any (key, value) pairs whose key value is greater than Kn.

Example 45 may include a method to be performed by a computer, comprising: performing a mapping operation on a set of local data and generate a set of (key, value) pairs; transferring data via a non-volatile memory access over network specification from the mapper module to a remote solid state drive through remote random access; and
generating and transferring to the remote solid state drive:
at least one sequential value array, the value array comprising a set of (V, Vpriorindex) pairs, where: V is the value of a current (key, value) pair, and Vpriorindex is an index of a prior element of the sequential value array that stores the value of a previous (key, value) pair for the same key.

Example 47 may include the method of example 46, and/or other examples herein, further comprising: generating and maintaining in a memory of the computer: at least one sequential key array, the key array including a set of (K, Vindex) pairs, where: K is a unique key, and Vindex is an index of an element in the value array that stores the value of the latest (key, value) pair for the same key.

Example 48 may include the method of example 47, and/or other examples herein, further comprising: upon completion of the mapping operation on the set of local data, writing the sequential key array to the remote solid state drive.

Example 49 may include the method of any one of examples 46-48, and/or other examples herein, wherein the value of Vpriorindex for the first (V, Vpriorindex) pair for each key in the sequential value array is null.

Example 50 may include an apparatus for computing, comprising: means for performing a mapping operation on a set of local data and generate a set of (key, value) pairs; means for transferring data via a non-volatile memory access over network specification from the mapper module to a remote solid state drive through remote random access; and means for generating and transferring to the remote solid state drive: at least one sequential value array, the value array comprising a set of (V, Vpriorindex) pairs, where: V is the value of a current (key, value) pair, and Vpriorindex is an index of a prior element of the sequential value array that stores the value of a previous (key, value) pair for the same key.

Example 51 may include the apparatus for computing of example 50, and/or other examples herein, further comprising: means for generating and maintaining in a memory of the computer: at least one sequential key array, the key array including a set of (K, Vindex) pairs, where: K is a unique key, and Vindex is an index of an element in the value array that stores the value of the latest (key, value) pair for the same key.

Example 52 may include the apparatus for computing of example 51, and/or other examples herein, further comprising: means for writing the sequential key array to the remote solid state drive upon completion, by the means for mapping, of the mapping operation on the set of local data.

Example 53 may include the apparatus for computing of any one of examples 46-48, and/or other examples herein, wherein the value of Vpriorindex for the first (V, Vpriorindex) pair for each key in the sequential value array is null.

Example 54 may include a system, comprising a plurality of solid state drives in which are stored sets of (key, value) data pairs in a plurality of queues; a set of data reduction modules to perform data reduction operations on the sets of (key, value) data pairs to reduce an amount of values associated with a shared key; and a memory access module, communicably coupled to the set of data reduction modules, to directly transfer individual ones of the sets of queued (key, value) data pairs from the plurality of solid state drives through remote random access of the solid state drives, via a network, without using intermediate staging storage.

Example 55 may include the system of example 54, and/or other examples herein, further comprising a programming framework that supports the processing and distributed storage of very large data sets, and the data reduction operations are part of a Reduce operation under the framework.

Example 56 may include the system of example 54, and/or other examples herein, wherein the sets of queued (key, value) data pairs are intermediate (key, value) data pairs generated from a plurality of sources of (key, value) data pairs by a mapper on a computer system remote to the system, communicably coupled to the plurality of solid state drives.

Example 57 may include the system of example 54, and/or other examples herein, wherein the plurality of solid state drives comprise 3D Xpoint storage media.

Example 58 may include the system of example 54, and/or other examples herein, wherein the system is disposed in a data center Example 59 may include the system of any one of examples 54-58, and/or other examples herein wherein random access of the solid state drives is pursuant to a non-volatile memory access over network specification.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

What is claimed is:

1. An apparatus for computing, comprising:
a set of data reduction modules to perform data reduction operations on sets of (key, value) data pairs to reduce an amount of values associated with a shared key, wherein the (key, value) data pairs are stored in a plurality of queues located in a plurality of solid state drives remote from the apparatus; and
a memory access module, communicably coupled to the set of data reduction modules, to:
directly transfer individual ones of the sets of queued (key, value) data pairs from the plurality of remote solid state drives through remote random access of the solid state drives, via a network, without using intermediate staging storage; and
for each data reduction module, transfer, from selected ones of the plurality of queues located in the plurality of remote solid state drives, (key, value) data pairs in a global order.

2. The apparatus of claim 1, wherein the apparatus further comprises a programming framework that supports the processing and distributed storage of very large data sets, and the data reduction operations are part of a Reduce operation under the framework.

3. The apparatus of claim 1, wherein the sets of queued (key, value) data pairs are intermediate (key, value) data pairs generated from a plurality of sources of (key, value) data pairs by a mapper on a computer system remote to the apparatus, communicably coupled to the remote solid state drives.

4. The apparatus of claim 3, wherein the mapper is part of a Map module under a programming framework that supports the processing and distributed storage of very large data sets.

5. The apparatus of claim 1, wherein the (key, value) data pairs stored in the plurality of queues are stored in a local order indexed by the keys.

6. The apparatus of claim 1, wherein the remote solid state drives include byte-addressable random access non-volatile memory.

7. The apparatus of claim 1, wherein the transfer in a global order includes transfer of all (key, value) pairs corresponding to a key Kn from the selected ones of the plurality of queues, prior to transfer of any (key, value) pairs whose key value is greater than Kn.

8. The apparatus of claim 1, wherein the memory access module transfers the individual ones of the sets of queued (key, value) data pairs from the plurality of remote solid state drives using unsynchronized raw block device accesses pursuant to a non-volatile memory access over network specification.

9. The apparatus of claim 1, wherein each of the set of data reduction modules performs a single specific reduce operation at a point in time.

10. A method to be performed by a computer, comprising:
transferring, by a memory access module, individual ones of sets of queued (key, value) data pairs from a plurality of solid state drives remote from the computer, in which the (key, value) data pairs are stored in a plurality of queues, by direct transfer through remote random access of the solid state drives, via a network, without using intermediate staging storage, wherein the transferring includes:
transferring, from selected ones of the plurality of queues located in the plurality of remote solid state drives, a set of (key, value) pairs in a global order, wherein the transferring in a global order includes transferring all (key, value) pairs corresponding to a key Kn from the selected ones of the plurality of queues, prior to transferring any (key, value) pairs whose key value is greater than Kn; and
providing the individual ones of sets of queued (key, value) data pairs to a set of data reduction modules communicably connected to the memory access module.

11. The method of claim 10, wherein the memory access module transfers the individual ones of the sets of queued (key, value) data pairs from the plurality of remote solid state drives using unsynchronized raw block device accesses pursuant to a non-volatile memory access over network specification.

12. The method of claim 10, wherein the data reduction modules perform data reduction operations on sets of (key, value) data pairs to reduce an amount of values associated with a shared key.

13. The method of claim 10, wherein the sets of queued (key, value) data pairs are intermediate (key, value) data pairs generated from a plurality of sources of (key, value) data pairs by a mapper on a computer system remote to the computer, coupled to a remote solid state memory.

14. The method of claim 10, wherein the remote solid state drives include byte-addressable random access non-volatile memory.

15. The method of claim 10, wherein the queued (key, value) data pairs stored in the plurality of remote solid state drives are stored in a local order indexed by the keys.

16. An apparatus for computing, comprising:
a mapper module to perform mapping operations on sets of (key, value) pairs to map an amount of values to a shared key to generate a set of (key, value) pairs;
a memory write module, communicably connected to the mapper module, to transfer data via a non-volatile memory access over network specification from the mapper module to a remote solid state drive through remote random access;
a memory; and
a memory management module, communicably coupled to the memory and the memory write module, to generate and write into the remote solid state drive:
at least one sequential value array, the value array comprising a set of (V, Vpriorindex) pairs, where:
V is the value of a current (key, value) pair, and
Vpriorindex is an index of a prior element of the sequential value array that stores the value of a previous (key, value) pair for the same key.

17. A system, comprising
a plurality of solid state drives in which are stored sets of (key, value) data pairs in a plurality of queues;
a set of data reduction modules to perform data reduction operations on the sets of (key, value) data pairs to reduce an amount of values associated with a shared key; and
a memory access module, communicably coupled to the set of data reduction modules, to:
directly transfer individual ones of the sets of queued (key, value) data pairs from the plurality of solid state drives through remote random access of the solid state drives, via a network, without using intermediate staging storage; and
for each data reduction module, transfer, from selected ones of the plurality of queues located in the plurality of remote solid state drives, (key, value) data pairs in a global order.

18. The system of claim 17, wherein random access of the solid state drives is pursuant to a non-volatile memory access over network specification.

* * * * *